United States Patent [19]

Kulig

[11] 4,253,602
[45] Mar. 3, 1981

[54] TRAY CONTAINER WITH DOUBLE PANEL SIDEWALLS

[75] Inventor: Francis V. Kulig, Morris, Ill.

[73] Assignee: Federal Paper Board Co., Inc., Montvale, N.J.

[21] Appl. No.: 54,719

[22] Filed: Jul. 5, 1979

[51] Int. Cl.³ ............................ B65D 5/22; B65D 5/24
[52] U.S. Cl. ................................. 229/31 R; 229/34 A
[58] Field of Search ................ 229/31 R, 31 FS, 34 A

[56] References Cited

U.S. PATENT DOCUMENTS

| | | | |
|---|---|---|---|
| 1,271,033 | 7/1918 | Hall | 229/31 R |
| 1,959,613 | 5/1934 | Carson | 229/31 R |
| 2,071,949 | 2/1937 | Reich | 229/31 R |
| 2,334,425 | 11/1943 | Lowey | 229/31 FS |
| 2,366,602 | 1/1945 | DeHaven | 229/34 A |
| 2,495,807 | 1/1950 | Buttery | 229/31 R X |
| 2,928,580 | 3/1960 | Arneson | 229/31 FS |
| 3,137,434 | 6/1964 | Berg | 229/31 I |
| 3,531,041 | 9/1970 | Rohde | 229/31 FS |
| 3,904,104 | 9/1975 | Kane | 229/31 R |
| 4,114,797 | 9/1978 | Mamizza | 229/31 FS |

Primary Examiner—Davis T. Moorhead
Attorney, Agent, or Firm—Guy A. Greenawalt

[57] ABSTRACT

A tray-type container and a method of forming the same is disclosed wherein the container is formed from a single blank of paperboard having a coating of a film material which will withstand oven temperatures commonly employed in bakeries, the container having, when fully set up, a rectangular bottom wall forming panel with hingedly connected upstanding sidewall and end wall forming panels which are integrally connected at the corners by pairs of triangular web members folded upon each other and against the outside faces of the inner end wall panels where they are secured by outer end wall panels hinged to the top edges and folded downwardly into overlying relation with the folded web members and the inner end wall panels, which outer end wall panels have marginal strips turned under the bottom wall and sealed to end margins of the latter.

2 Claims, 6 Drawing Figures

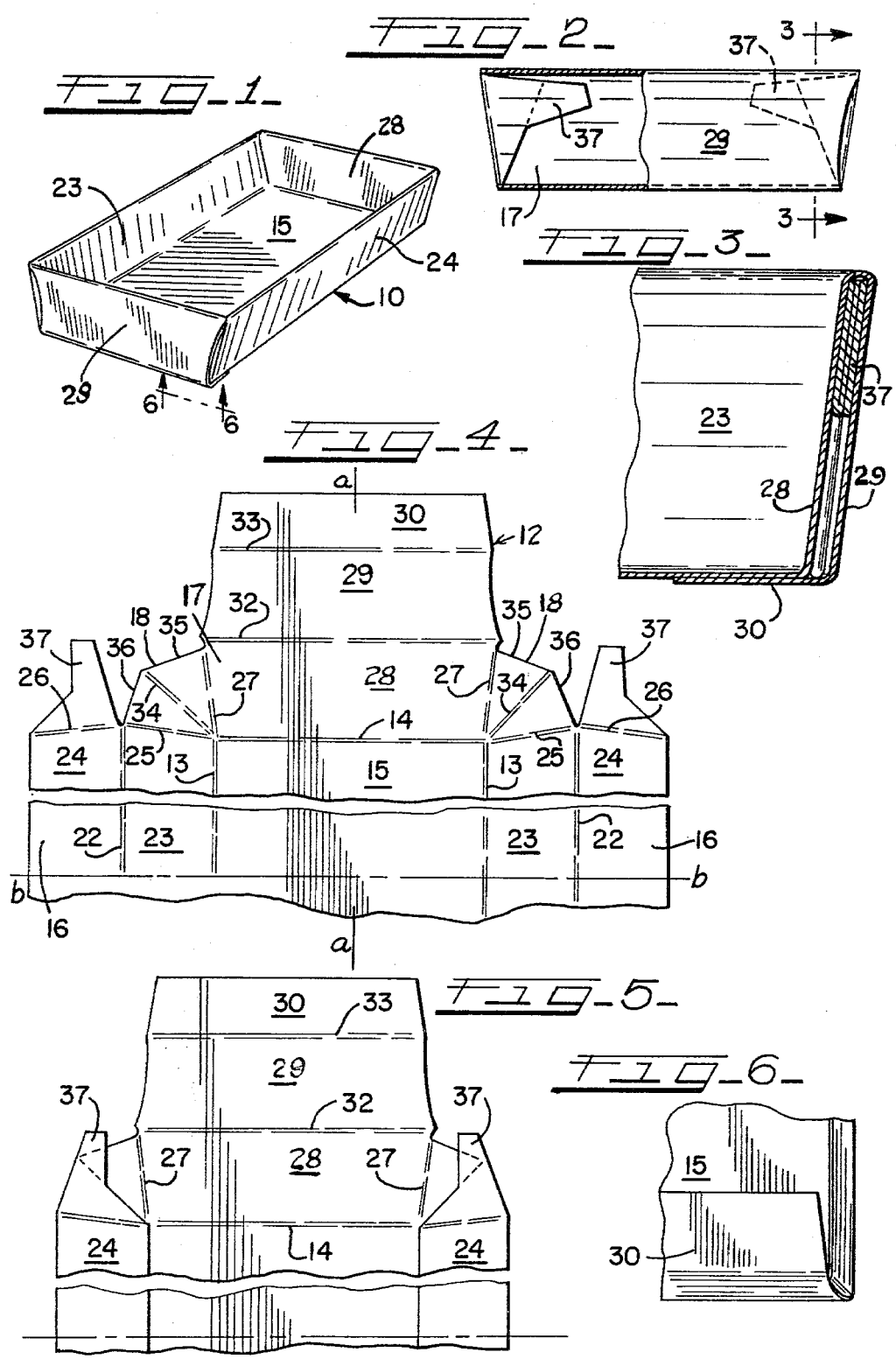

TRAY CONTAINER WITH DOUBLE PANEL SIDEWALLS

BACKGROUND OF THE INVENTION

This invention relates to containers and is more particularly concerned with improvements in product containers which are in the form of a tray and which are adapted to be fabricated from paperboard which is coated with a film forming material of a character which will withstand oven temperatures commonly employed in bakeries and enable the container to be used for processing and marketing of products which may be in a flowable state when initially placed in the tray, such as, bakery products.

Tray containers have been developed heretofore which are particularly adapted for use in the bakery industry where the product may be processed in an oven and subsequently marketed without removing it from the container in which it has been processed. Products such as cakes, pastry, and the like are generally in a flowable state initially, that is, in a liquid or semi-liquid condition, and it is a requirement that the container be leakproof when filled to a predetermined level with the product and capable of withstanding oven temperatures during the baking process without damage from the heat so that the baked product may be marketed without removal from the container. For such products, containers have been developed which are adapted to be formed from thin metal foil or relatively stiff metallic sheet material which can be pressed or shaped to the desired form and become part of the final package in which the product is marketed. Such containers are generally expensive and lacking in aesthetic appeal since they do not readily accept the inks commonly employed in decorative printing. Efforts have been made, with some success, to provide non-metallic trays which are suitable for this purpose. One such tray structure is disclosed in U.S. Pat. No. 4,114,797 granted Sept. 19, 1978. A further tray development is disclosed in application Ser. No. 036,326, filed May 7, 1979. However, it appears that there is a need for trays of this type which have greater rigidity or stiffness, particularly in the sidewall panels and which are otherwise more convenient for use in the handling of certain materials in the bakery industry.

It is a general object therefore of the present invention to provide an improved open top tray structure of the type described which has greater rigidity than trays of this type heretofore produced, which is more economical to manufacture than similar trays formed of metal foil, and the like, and which affords greater convenience in use, particularly, in the preparation and marketing of bakery products.

It is a more specific object of the invention to provide an improved tray structure and a method of forming the same in which the tray is fabricated from a paperboard blank which is coated with a film of plastic material having sufficient heat resisting characteristics to withstand oven temperatures commonly employed in the baking industry, which may be safely used in microwave ovens, and which may be supplied to the user as a cut and scored blank, or partially folded blank, so that it can be set up with side and end wall panels upstanding from a rectangular bottom wall panel and connected at the corners by pairs of integral web members which are folded upon each other and against the outside face of an end wall with tab members for reinforcing the corner connections which tab members extend inwardly of the opposite ends of the end walls and are sealed to end wall reinforcing and covering panel members at each end, which panel members are integral with the top edge of the end wall and are folded down so as to overlie the end wall and the associated folded corner web members and which have marginal portions folded underneath and adhesively secured to the bottom wall panel.

It is a further object of the invention to provide a tray structure of the type described and a method of fabricating the same so as to provide integral reinforcing and covering panel members on the sidewall and end wall panels which covering members are disposed in overlying double wall panel relation on the outside of the side and end wall panels, with the end wall reinforcing and covering members being adhesively connected to tab members forming end extensions on the sidewall members which are folded to lie against the end wall panels of the tray and with the end margins of end wall reinforcing and covering members folded into engagement with and adhesively secured to bottom wall panel portions.

The invention as herein disclosed and claimed comprises a tray structure and a method of forming the same from a cut and scored blank of paperboard coated with a heat resistant plastic film material which tray structure comprises a bottom wall forming panel and oppositely disposed pairs of peripherial sidewall forming panels which are integrally hinged into upstanding relation with the bottom wall forming panel and connected at the intersecting corners by pairs of integrally hinged triangular web members folded into overlying relation on the outside face of the one sidewall panel and secured by corner reinforcing tab members which are disposed beneath a reinforcing and covering panel member which is intergrally hinged to the top edge of the associated sidewall forming panel and turned down into overlying relation with the sidewall forming panel and with portions of the bottom wall panel to which end portions thereof are adhesively secured.

BRIEF DESCRIPTION OF THE DRAWINGS

FIG. 1 is a perspective view of a tray type container which embodies the principal features of the invention;

FIG. 2 is an elevational view showing the end of the tray container of FIG. 1, with portions of an outside panel broken away;

FIG. 3 is a cross sectional view taken on line 3—3 of FIG. 2 to an enlarged scale;

FIG. 4 is a plan view with portions broken away, showing the outside face of a portion of a paperboard blank which is cut and scored preparatory to the forming of the tray shown in FIG. 1;

FIG. 5 is a partial plan view showing an initial folding step in the forming of the tray; and FIG. 6 is a fragmentary perspective view showing a bottom corner of the tray.

DESCRIPTION OF A PREFERRED EMBODIMENT OF THE INVENTION

Referring to the drawings, there is illustrated a tray type container or carton 10 which is particularly adapted for use in the preparation and marketing of bakery products, or the like, which tray structure is fabricated from a single sheet of flexible paperboard cut and scored as illustrated in FIG. 4. It will be understood that the container shown in the drawings is described and illustrated for the purpose of setting forth the presently preferred form of the invention and that the principles of the invention may be otherwise applied.

The tray 10, as illustrated in FIGS. 1, 2, and 3, is fabricated from the cut and scored blank 12 which is shown in FIG. 4 with the face uppermost which will be the outside face in the set up tray. In the form illustrated, the blank 12 is prepared from paperboard, of relatively light weight or gauge, which is coated or laminated with a suitable material to render it resistant to damage when subject to high temperatures, such as, baking oven temperatures. The paperboard stock is of a gauge which will provide the degree of stiffness desired so that, the fully formed tray or carton will retain its normal shape when filled with the liquid product which is to be processed. The illustrated material is provided with a coating of material which will increase its resistance to absorption of heat to the degree desired for withstanding baking oven temperatures and which will also permit sealing of the coated surface to the paperboard surface with cold, heated, or heat activated adhesive. A suitable treatment of paperboard stock to form the blank 12 is set forth in U.S. Pat. No. 3,904,104 granted Sept. 9, 1976, to William Paul Kane.

The blank 12 is shown in FIG. 4 with the uncoated face uppermost, which face becomes the outside face in the finished tray. The blank 12 is in the form of a generally rectangular sheet of the foldable material and is cut and scored or creased, so that it is symmetrical about longitudinal and transverse center lines a—a and b—b (FIG. 4). Only one end of the blank is illustrated, it being understood that the other end is cut and scored in like manner. The blank is divided by a pair of parallel, longitudinally extending, transversely spaced, hinge forming score or crease lines 13 and a pair of parallel transversely extending, longitudinally spaced, hinge forming score or crease lines 14 so as to define a rectangular bottom wall forming center panel 15. The lines 13 and 14 define the innermost edges of the side sections 16 and end sections 17 of the blank which are subdivided so as to form the double panel side and end walls of the tray. Only one of the blank end sections 17 is shown in FIG. 4. The four corners of the blank are cut to provide web portions 18 of identical construction which extend between inner portions of the blank side sections 16 and inner portions of the blank end sections 17, only two of which are shown at 18 in FIG. 4. The blank side sections 16 are divided in an identical manner by hinge score lines 22 which are parallel with the score lines 13 and equally spaced outboard of the same to provide inner, main sidewall forming panels 23 and outer sidewall reinforcing panels 34. The transverse score line 14 at each end of the blank is extended at its opposite ends on lines 25 and 26. The lines 25 extend on a slight angle or inclination in the direction of the end of the blank and define the ends of the main sidewall panels 23 while the lines 26 are inclined in the opposite direction and define the ends of the sidewall reinforcing panels 24 which extend along the free outer margins of the blank. The score lines 25 also define one of the fold lines for the corner web portions 18. The longitudinal score lines 13 are extended at their ends on lines 27 which are at a slight angle or inclination in the direction of the opposite sides of the blank and which define the ends of inner portions of the blank end sections 17. The blank end sections 17 are extended and subdivided to form an inner main end wall forming panel 28, an outer end wall reinforcing panel 29 and a relatively narrow glue flap 30 by score lines 32 and 33 which score lines 32 and 33 are parallel with and spaced outwardly of the score line 14, with the panel 29 having a width only slightly greater than panel 28. The corner connecting, web panels 18 are each divided by a center fold forming score line 34 which is inclined in the direction of the adjacent side edge of the blank so as to form pairs of triangular web panels of equal size which connect the ends of the main sidewall panels 23 with the main end wall panel 28. The outside terminal edges 35, 36 of the corner web panels 18 are cut on lines which are intersected by the diagonal score lines 34 with the two halves of each of these edges on lines approximately normal to the score lines 25 and 27 which define the ends of the associated main end wall 28 and sidewall panels 23, so that the pair of web panels 18 at each corner may be folded upon each other and into position along the outside face of the associated end wall panel 28 with the top edges 35, 36 of each triangular web panel positioned only a small distance below the fold line at the top edge 32 of the end wall panel 28 which permits the associated outer end wall panel 29 to be folded into overlying relation therewith. The outer sidewall reinforcing panels 24 are each extended at the ends thereof to provide integral corner connecting tabs 37. The tabs 37 extend beyond transverse hinge fold lines 26 and are cut so as to overlie the uppermost marginal portion of the adjacent triangular web panels, with the coated face exposed, when the outer sidewall panels 24 are folded about the lines 22 into the position shown in FIG. 5.

In forming the tray 10 from the blank 12, the blank may be supplied initially with the outer sidewall reinforcing panels 24 folded about the hinge score lines 22 onto the inner sidewall panels 23 as shown in FIG. 5 and adhesively secured to the panels 23. The cut and scored blank may, of course be supplied without any folding and the panels 24 may be folded by the user in setting up the tray. The inner end wall panels 28 are folded on the hinge lines 14 simultaneously with the folding of the inner sidewall panels 23 about the hinge lines 13. The corner connecting web structures 18 will fold with the end and sidewall panels with which they are integrally connected and the two halves of each such corner structure will fold upon themselves and about the hinge lines 27 with the folded panels being directed into overlying relation on the outside face of the end wall panels 28 leaving the corner connecting tabs 37 with the coated side or face exposed and enabling the outer end wall panels 29 to be folded about the lines 32 into overlying relation on the outside faces of the inner end wall panels 28 and the associated folded corner web structures, permitting sealing at their opposite ends to the corner reinforcing tabs 37. Any type sealing may be employed. The tabs 37 are folded around the top portions of the corners and reinforce the corners while at the same time they serve to hold the sidewall panels and end wall panels in position. The glue panels 30 at each end of the blank are turned on the hinge lines 33 into engagement with end portions of the bottom panel 15 and further secure the end wall structure while presenting a plain outside end surface and rigidifying the end wall. The resultant tray has relatively rigid, full depth, double panel end and sidewalls, with smooth outside and inside faces.

What is claimed is:

1. A container formed from a single cut and scored blank of paperboard sheet material which is coated with a heat resistant film forming material, said container being in the form of a rectangular tray having a bottom wall forming panel, integral sidewall and end wall forming panels in oppositely disposed paired relation upstanding from the periphery of the bottom wall forming panel and integral connecting web panels in paired relation at each corner, each pair of said web panels being folded upon a median line and into overlying relation on the outside face of the end wall to which they are hinged, so as to render the corner leakproof for at least a major portion of the depth of the tray, as measured from the bottom wall forming panel, said sidewall and end wall forming panels each having an integral reinforcing panel folded down from the top edge thereof and adhesively secured to the outside face of said panel, a corner reinforcing tab extending from the sidewall reinforcing panel and adhesively secured along the top margin of the outside face of the end wall panel against which the folded web panels are in overlying relation, each said reinforcing tab underlying the end wall reinforcing panel which is folded down from the top edge of said panel and which overlies and is adhesively secured to the corner reinforcing tab members, each said end wall reinforcing panel extending the full depth of the end wall panel to which it is hinged and secured in outer end wall forming relation and each said end wall reinforcing panel having a narrow terminal panel adhesively secured to end marginal portions of the bottom face of said bottom wall panel.

2. A cut and scored blank of foldable paperboard sheet material for fabricating a container in the form of a tray which blank is coated on one face with a heat resistant film forming material of a character which will resist damage to the paperboard at baking oven temperature, said blank being generally rectangular and cut and scored to provide a central bottom wall panel, pairs of oppositely disposed panels adapted to form sidewall and end wall members and pairs of triangular corner web members connecting adjacent ends of side and end wall panels, said blank being scored to provide sidewall and end wall reinforcing panels extending along the outboard margins of each of the sidewall and end wall forming panels which reinforcing panels have dimensions corresponding substantial to the dimensions of the adjoining side and end wall panels from which they extend and the material at the corners of the blank being further cut to provide a reinforcing tab at each corner which extends from the end of the side wall reinforcing panel and which is located relative to the associated end wall forming panel so that when folded against the outside face of said end wall panel the reinforcing tab will lie along a top margin forming portion of said end wall forming panel, each said end wall reinforcing panel having an end extension panel on the outer margin thereof which is separated therefrom by a hinge score line and dimensioned so as to enable the extension panel to be folded into engagement with the end portion of the bottom wall panel and secured thereto.

* * * * *

UNITED STATES PATENT AND TRADEMARK OFFICE
CERTIFICATE OF CORRECTION

PATENT NO. : 4,253,602
DATED : March 3, 1981
INVENTOR(S) : Francis V. Kulig

It is certified that error appears in the above—identified patent and that said Letters Patent is hereby corrected as shown below:

Column 5, line 15, delete "adhesively".

Column 5, line 15, delete "to the" and insert in place thereof -- so as to lie along the --.

Column 5, line 17, delete "adhesively".

Column 5, line 22, delete "overlies and".

Column 5, line 23, delete "adhesively".

Column 5, line 23, after "secured" insert -- in overlying relation --.

Signed and Sealed this

Sixteenth Day of June 1981

[SEAL]

Attest:

RENE D. TEGTMEYER

*Attesting Officer*  *Acting Commissioner of Patents and Trademarks*